US011452028B2

United States Patent
Bittner et al.

(10) Patent No.: US 11,452,028 B2
(45) Date of Patent: Sep. 20, 2022

(54) WIRELESS NETWORK PAIRING FOR WIRELESS ELECTRIC VEHICLE CHARGING

(71) Applicant: WiTricity Corporation, Watertown, MA (US)

(72) Inventors: Markus Bittner, Sarmenstorf (CH); Lukas Sieber, Olten (CH); Hans Peter Widmer, Wohlenschwil (CH)

(73) Assignee: WiTricity Corporation, Watertown, MA (US)

( * ) Notice: Subject to any disclaimer, the term of this patent is extended or adjusted under 35 U.S.C. 154(b) by 29 days.

(21) Appl. No.: 17/128,490

(22) Filed: Dec. 21, 2020

(65) Prior Publication Data

US 2021/0195501 A1 Jun. 24, 2021

Related U.S. Application Data

(60) Provisional application No. 62/951,081, filed on Dec. 20, 2019.

(51) Int. Cl.
*H04W 48/08* (2009.01)
*H04W 60/04* (2009.01)
(Continued)

(52) U.S. Cl.
CPC .......... *H04W 48/08* (2013.01); *B60L 53/126* (2019.02); *H04W 36/0077* (2013.01); *H04W 60/04* (2013.01); *H04W 72/048* (2013.01)

(58) Field of Classification Search
CPC . H04W 48/08; H04W 36/0077; H04W 60/04; H04W 72/048; H04W 4/24;
(Continued)

(56) References Cited

U.S. PATENT DOCUMENTS 10,300,805 B2 * 5/2019 Halker ................ B60L 53/122
11,115,813 B1 * 9/2021 Parker ................ H04W 36/28
(Continued)

FOREIGN PATENT DOCUMENTS

WO 2015009482 1/2015
WO 2021127619 6/2021

OTHER PUBLICATIONS

"International Search Report and Written Opinion", Application No. PCT/US2020/066325, dated Apr. 8, 2021, 25 pages.
(Continued)

*Primary Examiner* — Nishant Divecha
(74) *Attorney, Agent, or Firm* — Colby Nipper PLLC

(57) ABSTRACT

A vehicle is paired to a selected wireless charging station of a plurality of wireless charging stations by joining the vehicle to a first wireless network provided by a central access point, assigning a channel to use for pairing the vehicle to the selected wireless charging station by a network manager, transmitting a channel identifier to the vehicle over the first wireless network, and transmitting the channel identifier to the plurality of wireless charging stations. The vehicle then configures a beacon device coupled to the vehicle to use the assigned channel and moves into proximity of the selected wireless charging station. The selected wireless charging station detects a beacon signal of the beacon device, confirms that the beacon signal is using the identified channel, and transmits information identifying a second wireless network to the vehicle. The vehicle can then join the second wireless network using the transmitted information.

19 Claims, 5 Drawing Sheets

(51) Int. Cl.
    *H04W 72/04*     (2009.01)
    *B60L 53/126*    (2019.01)
    *H04W 36/00*     (2009.01)

(58) Field of Classification Search
    CPC .... B60L 53/126; B60L 53/122; B60L 53/124;
            B60L 53/30; Y02T 10/70; Y02T 10/7072;
            Y02T 90/12; Y02T 90/14
    See application file for complete search history.

(56)           References Cited

U.S. PATENT DOCUMENTS

| | | | |
|---|---|---|---|
| 2015/0042168 A1 | 2/2015 | Hanspeter et al. | |
| 2017/0164179 A1* | 6/2017 | Jeon | H04W 76/11 |
| 2019/0098565 A1* | 3/2019 | Cherian | H04W 48/18 |
| 2019/0225107 A1* | 7/2019 | Morizono | H02J 13/00006 |
| 2020/0262307 A1* | 8/2020 | Rosene | B60L 53/67 |
| 2020/0275273 A1* | 8/2020 | Smith | H04W 12/08 |
| 2020/0307403 A1* | 10/2020 | Rastoll | B60L 53/37 |
| 2021/0051574 A1* | 2/2021 | Chu | H04W 84/18 |

OTHER PUBLICATIONS

"International Preliminary Report on Patentability", Application No. PCT/US2020/066325, dated May 17, 2022, 21 pages.

\* cited by examiner

WIRELESS NETWORK PAIRING FOR WIRELESS ELECTRIC VEHICLE CHARGING

RELATED APPLICATION

This present disclosure claims priority to U.S. Provisional Patent Application Ser. No. 62/951,081 filed Dec. 20, 2019, the disclosure of which is incorporated by reference herein in its entirety.

BACKGROUND

This application relates to wireless network pairing, and in particular, to coordinating the pairing of an electric vehicle to a wireless network provided by a given wireless charging station.

SUMMARY

In general, in some aspects, a vehicle is paired to a selected wireless charging station of a plurality of wireless charging stations by joining the vehicle to a first wireless network provided by a central access point, assigning a channel to use for pairing the vehicle to the selected wireless charging station by a network manager, transmitting a channel identifier to the vehicle over the first wireless network, and transmitting the channel identifier to the plurality of wireless charging stations. The vehicle then configures a beacon device coupled to the vehicle to use the assigned channel and moves into proximity of the selected wireless charging station. The selected wireless charging station detects a beacon signal of the beacon device, confirms that the beacon signal is using the identified channel, and transmits information identifying a second wireless network to the vehicle. The vehicle can then join the second wireless network using the transmitted information.

Implementations may include any of the following, in any combination. Joining the vehicle to the first wireless network may include the vehicle detecting the first wireless network and automatically joining the first wireless network. Joining the vehicle to the first wireless network may include the vehicle receiving a user input selecting the first wireless network and instructing the vehicle to join the first wireless network. Joining the vehicle to the first wireless network may include determining that the vehicle is moving below a predetermined speed, searching for available wireless networks, detecting the first wireless network, determining that the first wireless network is associated with the plurality of wireless charging stations, and joining the first wireless network. The second wireless network may be provided by the selected wireless charging station. The plurality of wireless charging stations may each be connected to the first wireless network. The first wireless network may include a WiFi network; the second wireless network may include a WiFi network. Transmitting the information identifying the second wireless network to the vehicle may be performed by a device other than the selected wireless charging station.

Information identifying the vehicle may be provided to the plurality of wireless charging stations, and that information may be used to confirm, at the selected wireless charging station, that the detected beacon signal is provided by the identified vehicle. The second wireless network may be activated after detecting the beacon signal at the selected wireless charging station and confirming that the beacon signal is using the assigned channel. Alignment guidance may be provided from the selected wireless charging station to the vehicle over the first wireless network after detecting the beacon signal at the selected wireless charging station and confirming that the beacon signal is using the assigned channel. Alignment guidance may be provided from the selected wireless charging station to the vehicle over the second wireless network after the vehicle has joined the second wireless network. In some aspects, the network manager may determine which of the plurality of wireless charging stations are available for use by the vehicle, and the channel identifier may be transmitted to only the determined wireless charging stations that are available for use by the vehicle.

In general, in some aspects, a vehicle includes a wireless network interface, a beacon device, and a processor. The processor establishes communication between the vehicle and a selected one of a plurality of wireless charging stations by performing operations, including joining the vehicle's wireless network interface to a first wireless network provided by a central access point. The operations also include receiving, over the first wireless network, a channel identifier of an assigned channel to use for pairing the vehicle to the selected one of the plurality of wireless charging stations. In addition, the operations include configuring, based on the channel identifier, the beacon device to use the assigned channel. The operations further include receiving, over the first wireless network, information identifying a second wireless network associated with the selected one of the plurality of wireless charging stations. The operations also include joining the vehicle's wireless network interface, based on the received information, to the second wireless network to pair with the selected one of the plurality of wireless charging stations.

In general, in some aspects, a wireless charging station includes a wireless network interface and a processor. The processor establishes communication with a vehicle by performing operations, including providing a first wireless network and receiving, from a network manager, a channel identifier of an assigned channel to use for pairing with the vehicle. In addition, the operations include detecting a beacon signal operating at the assigned channel. The operations also include transmitting, to the network manager, information associated with the detecting of the beacon signal. The operations further include receiving a request from the vehicle to join the first wireless network and enabling the vehicle to join the first wireless network.

The processor may provide the first wireless network only after detecting the beacon signal. The processor may use the wireless network interface to communicate with the network manager over a second wireless network. The processor may communicate with the network manager over a network interface other than the wireless network interface.

In general, in some aspects, a network manager includes a wireless access point and a processor. The wireless access point is configured to provide a first wireless network. The processor is configured to coordinate pairing a vehicle to a selected wireless charging station of a plurality of wireless charging stations that are under control of the network manager by performing operations including receiving a request from the vehicle over the first wireless network and assigning a channel to use for pairing the vehicle to the selected wireless charging station. The operations also include transmitting a channel identifier of the assigned channel to the vehicle over the first wireless network to enable the vehicle to configure a beacon device coupled to the vehicle to provide a beacon signal using the assigned channel. In addition, the operations include transmitting the channel identifier to the plurality of wireless charging stations. The operations further include receiving an indication from the selected wireless charging station that the selected wireless charging station has detected the beacon signal using the identified channel. The operation also includes transmitting, to the vehicle, information identifying a second wireless network provided by the selected wireless charging station to enable the vehicle to pair with the selected wireless charging station.

In general, in some aspects, a secondary device can be paired to a selected one of a plurality of primary devices by a method including joining the secondary device to a first wireless network provided by a central access point, determining an identification of an assigned channel to use for pairing the secondary device to the selected one of the plurality of primary devices, and transmitting the channel identification to the secondary device over the first wireless network. The method also includes transmitting the channel identifier to the plurality of primary devices. The method further includes configuring a beacon device coupled to the secondary device to use the assigned channel and moving the secondary device into proximity of the selected primary device. In addition, the method includes detecting, at the selected one of a plurality of primary devices, a beacon signal of the beacon device using the identified channel. The method also includes, based on the detecting, transmitting information identifying a second wireless network to the secondary device, and joining the secondary device to the second wireless network based on the transmitted information.

DETAILED DESCRIPTION

Wireless charging of electric vehicles is described in detail in patents such as U.S. Pat. No. 8,933,594, titled "Wireless energy transfer for vehicles," and U.S. Pat. No. 9,561,730, titled "Wireless power transmission in electric vehicles," which are incorporated here by reference in their entirety. One aspect of wireless electric vehicle charging to be addressed is establishing network communications between the electric vehicle and the wireless charging station at which the electric vehicle is parked. This establishment of network communications can be particularly difficult in a facility with multiple wireless charging stations, at which multiple electric vehicles may be attempting to park at the same time.

As an example of one particular problem, a vehicle may establish network communications with a wireless charging station in an adjacent parking spot, determining that it has established communication with the correct wireless charging station in its own parking spot. When the vehicle requests power and does not receive it (because it is in communication with the wrong wireless charging station), the vehicle may not detect the source of the problem. Likewise, the wireless charging station in the adjacent parking spot may detect a fault because it is providing power and recognizing no load. This problem may be referred to as "cross-connect." In addition to the primary function of providing power being compromised in a cross-connect situation, additional features (e.g., vehicle alignment guidance) and safety features (e.g., foreign-object detection) may not operate properly, if at all, when communications are not established between the vehicle and the correct wireless charging station.

Figure 1:
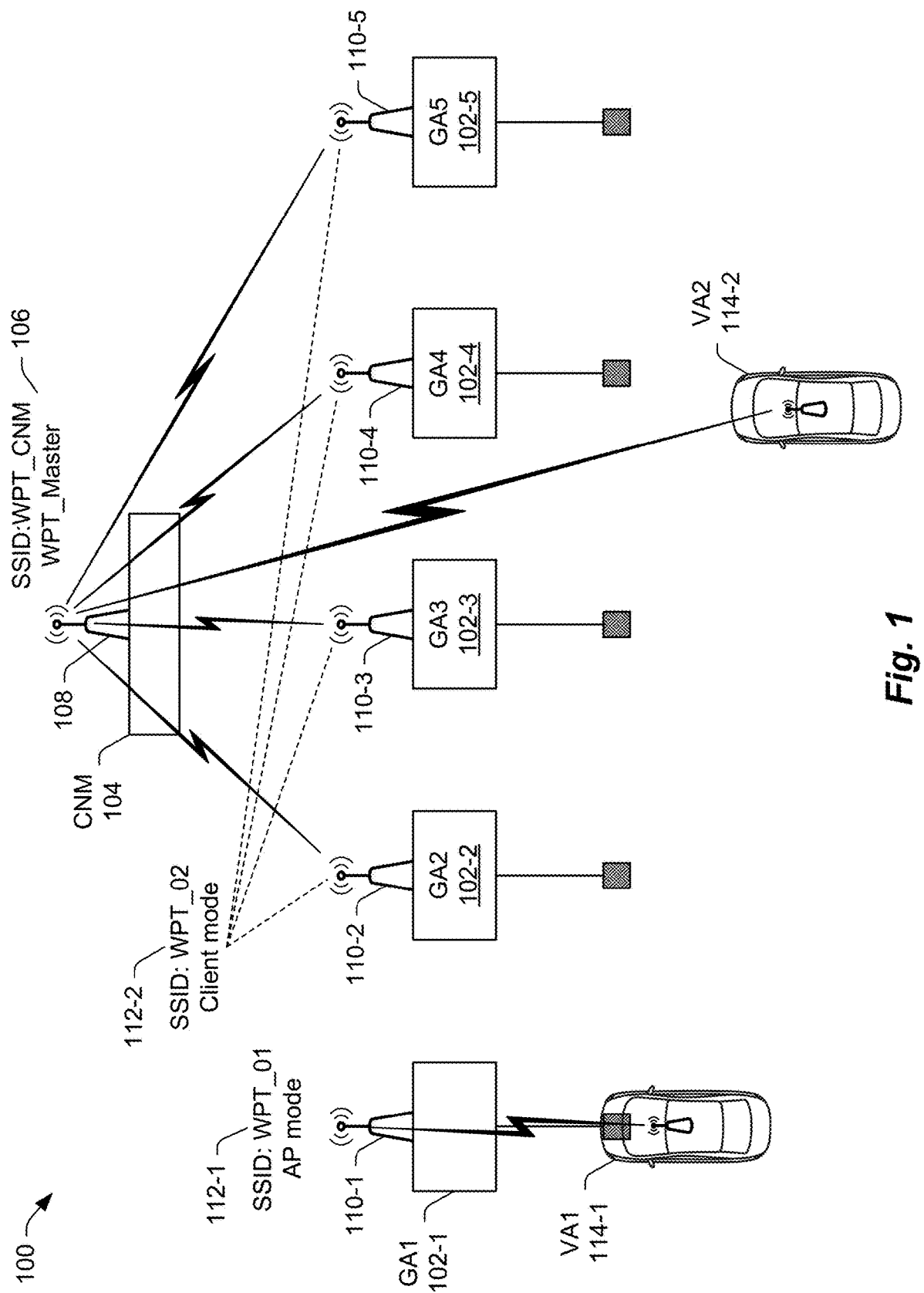
FIG. 1 illustrates an example electric vehicle charging environment including a parking facility with multiple wireless charging stations for use by electric vehicles.

FIG. 1 illustrates an example electric vehicle charging environment 100 including a parking facility with multiple wireless charging stations for use by electric vehicles. As shown in the illustrated example, multiple wireless charging stations 102 (e.g., GA1 102-1, GA2 102-2, GA3 102-3, GA4 102-4, GA5 102-5) are in communication with a central network manager (CNM) 104, which includes a central access point. Any suitable number of wireless charging stations 102 can be implemented. The CNM 104 provides, or is coupled to, a first wireless network 106 with the network Service Set Identifier (SSID) (e.g., SSID WPT_CNM). A wireless access point 108 (e.g., central access point) providing the first wireless network with the network SSID WPT_CNM may be an integral component of the CNM 104. In another example, the wireless access point 108 may be a stand-alone device or part of other network infrastructure in communication with the CNM 104 through other mechanisms, including a wired network or an internal data bus. While WiFi (IEEE 802.11) is used in FIG. 1 and generally herein as an example communication standard, other network physical layers and higher-level protocols may also be used, such as Bluetooth® or IEEE 802.15.4 (low-rate wireless networks, such as ZigBee®).

In the illustrated example, each of the wireless charging stations GA1 102-1 through GA5 102-5 has a wireless network interface 110 (e.g., wireless network interfaces 110-1, 110-2, 110-3, 110-4, and 110-5, respectively), and is capable of functioning as a wireless access point for its own private network 112, indicated by network SSID corresponding to the station's number: GA1 102-1 broadcasts a private network 112-1 with the network SSID WPT_01, GA2 102-2 broadcasts another private network 112-2 with the network SSIDWPT_02, and so forth. In some aspects, the charging stations 102 can communicate with the CNM 104 over a network interface other than the wireless network interface 110. During the example scenario depicted in FIG. 1, GA1 102-1 is already charging a vehicle 114 (VA1 114-1) and using its own wireless network (e.g., private network 112) to communicate with the VA1 114. The other wireless charging stations (GA2 102-2 through GA5 102-5) are using their network interfaces to communicate with the CNM 104 over the first wireless network 106 with the network SSID WPT_CNM. A second vehicle (VA2 114-2) is searching for a place to park and charge and has also joined the first wireless network 106 (WPT_CNM).

Figure 2:
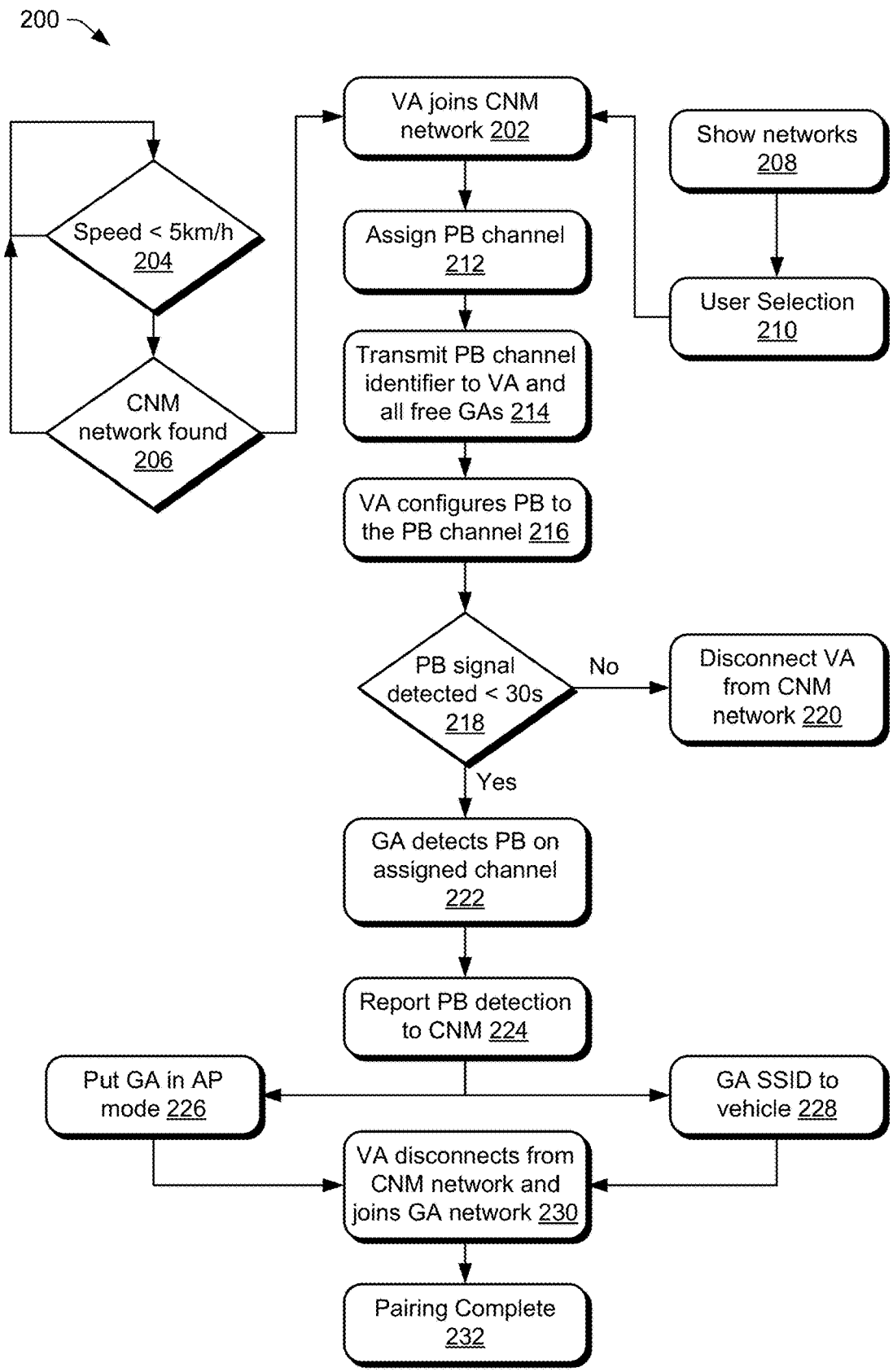
FIG. 2 depicts a flow chart of an example method for pairing a vehicle to one of multiple wireless charging stations in relation to the electric vehicle charging environment of FIG. 1.

FIG. 2 depicts a flow chart of an example method 200 for pairing a vehicle to one of multiple wireless charging stations, 102 in relation to the electric vehicle charging environment 100 of FIG. 1. In particular, the method 200 depicted in FIG. 2 relates to pairing the second vehicle (e.g., VA2 114-2) to an available wireless charging station of the wireless charging stations 102.

At step 202, the vehicle 114 joins the wireless network 106 associated with the CNM 104, as illustrated in FIG. 1. This step may be automatically initiated when, at step 204, the vehicle 114 is moving below a predetermined speed (e.g., a threshold speed) associated with parking the vehicle 114, such as 5 km/h, and the vehicle 114, at step 206, searches for available wireless networks and detects a network SSID with prefix "WPT_", indicating to the vehicle 114 that the wireless network 106 is a wireless charging control network. Using the network SSID, the vehicle 114 may determine that the wireless network 106 is associated with multiple wireless charging stations 102. Other factors, including the signal strength (e.g., RSSI level) of the wireless network 106, may also be used to initiate a connection. Alternatively, the vehicle 114 may, at step 208, display detected wireless networks on a user interface and, at step 210, receive a user input selecting one of the detected networks (e.g., the wireless network 106) that the user (e.g., driver) knows or suspects is associated with the wireless charging stations 102. The user input may also instruct the vehicle to join the wireless network 106.

After the vehicle 114 is joined to the wireless network 106, then at step 212, the CNM 104 assigns a passive beacon (PB) channel to the vehicle 114. Then, at step 214, the CNM 104 transmits an identifier (ID) (e.g., channel identifier) of that PB channel to the vehicle 114 and to all the available wireless charging stations 102. In some examples, the channel assignment is a specified frequency. In other examples, the channel assignment may include other characteristics, such as encoding schemes or encryption keys.

In the example of FIG. 1, the wireless charging stations 102 are only joined to the CNM's network (e.g., the wireless network 106) if they are available, so step 214 is simply to broadcast the PB channel to all wireless charging stations 102 that are on the network at that time. In some aspects, the CNM 104 determines which of the multiple wireless charging stations 102 are available for use by the vehicle and transmits the channel identifier to only those wireless charging stations determined to be available. The CNM 104 may be aware of a state of each wireless charging station 102 (e.g., available, charging, not in service, out of order) based on, for example, having received an indication of such status from each of the wireless charging stations 102.

The channel assignment and transmission of the channel identifier may be in response to a request from the vehicle 114 (not shown) or may be performed automatically in response to the vehicle 114 joining the wireless network 106. Passive beacons are typically used for providing alignment guidance between the vehicle 114 and the wireless charging station, as described in U.S. patent application Ser. No. 16/052,445, titled "Hybrid Foreign-Object Detection and Positioning System," which is incorporated here in its entirety. In this case, however, the passive beacon is re-purposed for use as a pairing identifier to prevent cross-connect problems.

Upon receipt of the PB channel identifier, the vehicle 114, at step 216, configures its beacon device (e.g., passive beacon) to use the PB channel corresponding to the PB channel identifier, and the vehicle 114 proceeds towards a selected parking spot. The selection of which parking spot to use may be determined by the driver (human or autonomous) or may be assigned by the CNM 104.

Each of the available wireless charging stations 102 listens for the passive beacon by energizing its foreign object detection (FOD) system or other systems used for detecting passive beacons during the parking procedure. At step 218, if none of the wireless charging stations 102 detect the beacon signal on the assigned channel within a specified time (e.g., 30 seconds) ("NO" at step 218), then at step 220, the CNM 104 terminates the wireless network connection to the vehicle 114 to disconnect the vehicle 114 from the CNM network, and the vehicle 114 may be forced to restart or abort the pairing method 200. When one of the available wireless charging stations 102 detects the beacon signal ("YES" at step 218), then at step 222, it determines which channel the passive beacon is using. At step 222, the wireless charging station 102 detects the passive beacon on the assigned channel and, thus, confirms that the passive beacon is using the assigned channel. Responsive to detecting the beacon signal using the assigned channel, the wireless charging station 102, at step 224, reports the PB detection to the CNM 104. In some cases, the wireless charging station 102 may, in response to detecting the beacon signal and confirming that the beacon signal is using the assigned channel, provide alignment guidance to the vehicle 114 over the wireless network 106.

When the CNM 104 receives the indication from one of the wireless charging stations 102 that the passive beacon has been detected using the assigned channel, then at step 226, the CNM 104 instructs that particular wireless charging station 102 to activate its own wireless network and also, at step 228, transmits information identifying the wireless charging station's wireless network to the vehicle 114, such as the SSID of the wireless charging station's wireless network. In some instances, the wireless charging station 102 may activate its own wireless network in response to detecting the beacon signal and confirming that the beacon signal is using the assigned channel. To further avoid cross-connect problems, the selected wireless charging station 102 may not broadcast the SSID of its own network (e.g., the SSID is hidden), but rather may depend on the vehicle 114 receiving the SSID from the CNM 104 so that other devices do not attempt to join the private network 112 of the selected wireless charging station 102. If the private network 112 is secured using a password, such as through the WiFi Protected Access standard WPA2, WPA3, or other security measures, the password may be provided to the vehicle 114 by the CNM 104 at the same time as the SSID. Alternatively, the password may be pre-configured in the vehicle's memory, for example, if the selected wireless charging station 102 is part of a subscription service to which the vehicle's operator subscribes.

At step 230, the vehicle 114 disconnects from the CNM network and connects to the private network 112 provided by the selected wireless charging station 102. Because the selected wireless charging station 102 has already confirmed its close proximity to the vehicle 114, per the detection of the beacon signal at the assigned channel, and only that particular vehicle 114 was given the wireless charging station's network SSID, it is assured that the vehicle 114 connecting to the wireless charging station's private network 112 is the correct vehicle. Accordingly, at step 232, the pairing method is complete, and the vehicle 114 and the selected wireless charging station 102 can now use the network connection between them (over the wireless charging station's private network 112) to negotiate any further configuration that is needed, including alignment guidance such as fine alignment of the vehicle 114 to a wireless charging coil of the wireless charging station 102, authorization to charge the vehicle 114, and parameters of the wireless charging field. In addition, after pairing is complete, the assigned channel can be reused for the next pairing process, e.g., for a different vehicle to pair with one of the other wireless charging stations 102.

In some examples, vehicle alignment to the wireless charging station 102 is completed while the vehicle 114 and the wireless charging station 102 are both still communicating over the CNM's network. In other examples, only initial alignment (e.g., getting the passive beacon into the detection range of the wireless charging station 102) is performed initially, and more-precise alignment is completed after the vehicle 114 has switched to the wireless charging station's network, possibly providing a lower-latency channel for communications as part of the alignment process.

In some examples, multiple vehicles 114 may simultaneously attempt to park. The CNM 104 can assign each vehicle 114 a different beacon channel and inform all the wireless charging stations 102 of all the assigned channels. When a given wireless charging station 102 reports which beacon channel is detected, the CNM 104 determines, based on the detected channel, which vehicle 114 to send the wireless charging station's SSID. More information can also be provided from the CNM 104 to the wireless charging stations 102, such as the vehicle's own identification, to further confirm the correct matching of the wireless charging station to vehicle 114. In this way, the wireless charging station 102 that detects the beacon signal can confirm that the detected beacon signal is provided by the identified vehicle 114.

Figure 3:
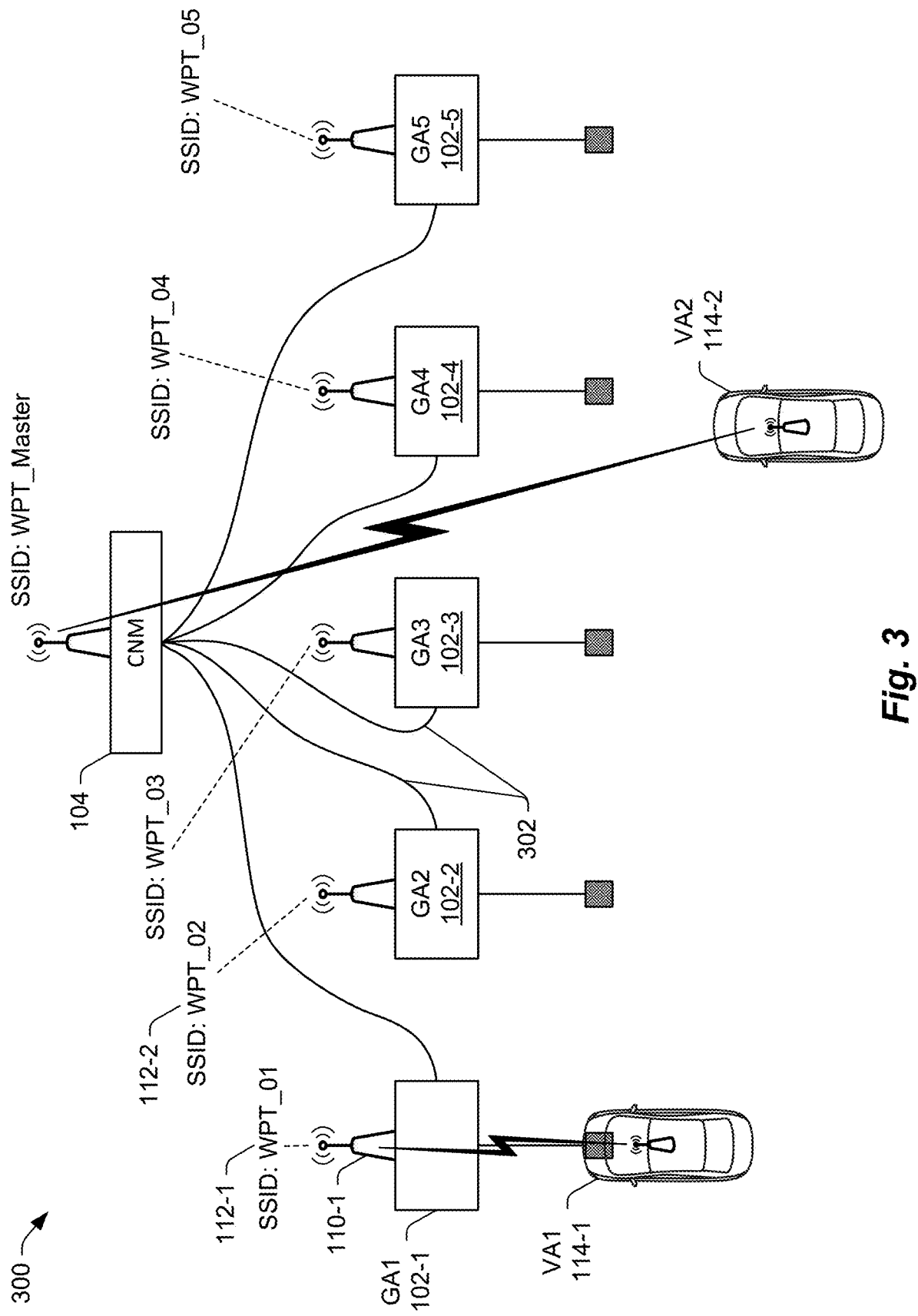
FIG. 3 illustrates another example electric vehicle charging environment including a parking facility with multiple wireless charging stations for use by electric vehicles.

Another example is shown in FIG. 3, which illustrates an example electric vehicle charging environment 300 including a parking facility with multiple wireless charging stations 102 for use by electric vehicles 114 (e.g., the VA1 114-1 and the VA2 114-2). In the illustrated example 300, the wireless charging stations 102 (e.g., GA1 102-1, GA2 102-2, GA3 102-3, GA4 102-4, GA5 102-5) each have a wired network connection 302, such as ethernet, to the CNM 104. This enables each of the wireless charging stations 102 to keep its own local network (e.g., the private network 112) up continuously and may provide lower latency for communications between the wireless charging stations 102 and the CNM 104.

Figure 4:
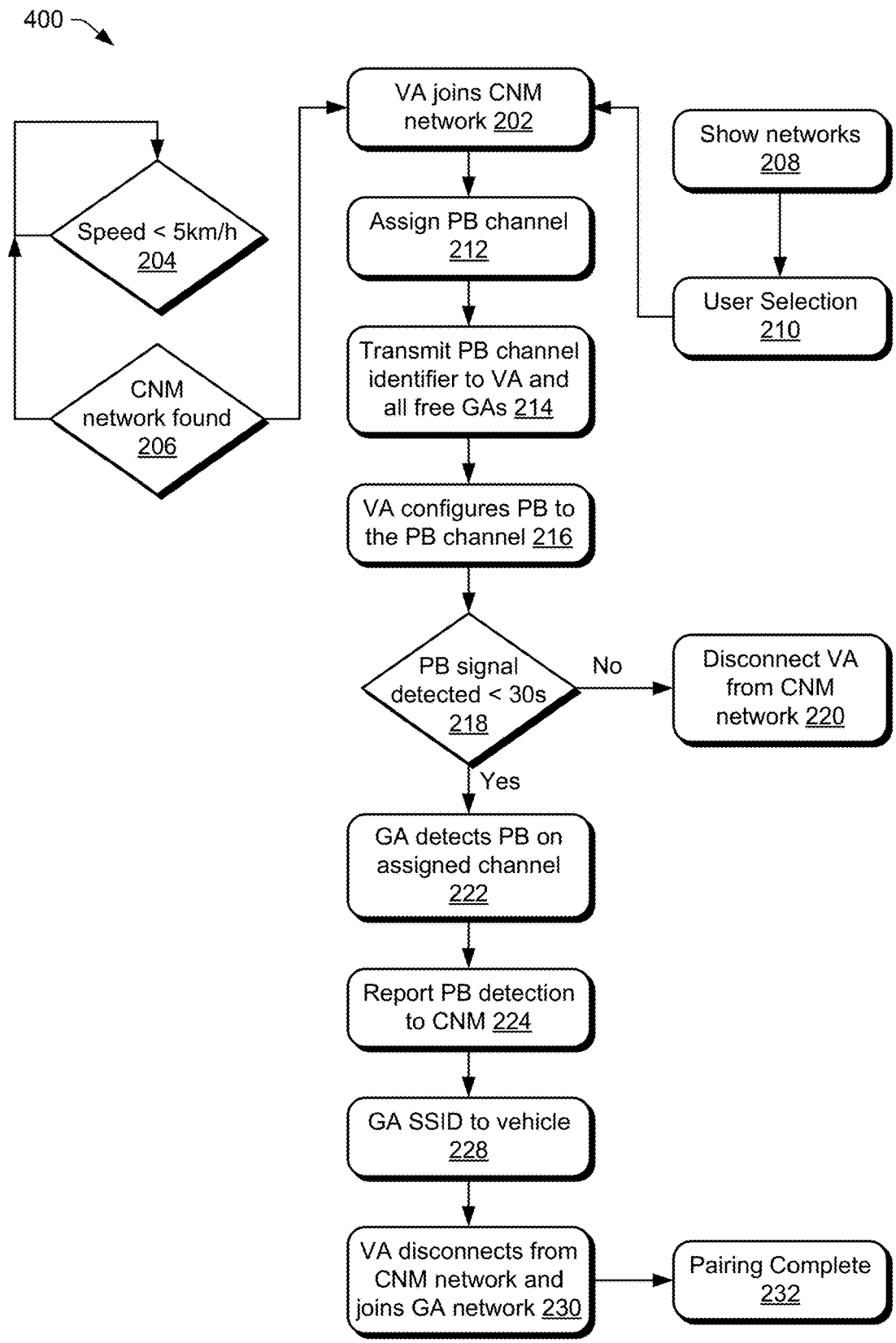
FIG. 4 depicts a flow chart of an example method for pairing a vehicle to one of multiple wireless charging stations, in relation to the electric vehicle charging environment of FIG. 3.

FIG. 4 depicts a flow chart of an example method 400 for pairing a vehicle to one of multiple wireless charging stations 102, in relation to the electric vehicle charging environment 300 of FIG. 3. The example method 400 is similar, although not identical, to the method 200 of FIG. 1. For example, when the vehicle 114, at step 202, connects to the CNM 104 over the main wireless network 106, the CNM 104, at 212, assigns a PB channel and, at 214, communicates the PB channel to the vehicle 114 and the wireless charging stations 102, as above. Also as above, at step 222, the wireless charging station 102 (if any) that detects a beacon signal using the assigned channel (at step 222) reports this, at step 224, to the CNM 104, which then, at step 228, indicates to the vehicle 114 the SSID of the wireless charging station 102 that detected the beacon signal. The vehicle 114 can then, at step 230, immediately connect to the wireless charging station's network (e.g., the private network 112), without waiting for the wireless charging station 102 itself to transition from being a client on the main wireless network 106 to being a source of its own private network 112. (In some examples, the wireless charging station 102 can be both a client and an access point simultaneously, depending on the capabilities of its network hardware.) Notice that because the wireless charging stations 102 already have their private networks 112 activated, there is no need for the CNM 104 to instruct the wireless charging station 12 to activate its private network 112. After the vehicle 114 has joined the wireless charging station's network (e.g., the private network 112), then at step 232, pairing is complete, and any further configuration and negotiation can be performed between the wireless charging station 102 and the vehicle 114.

Figure 5:
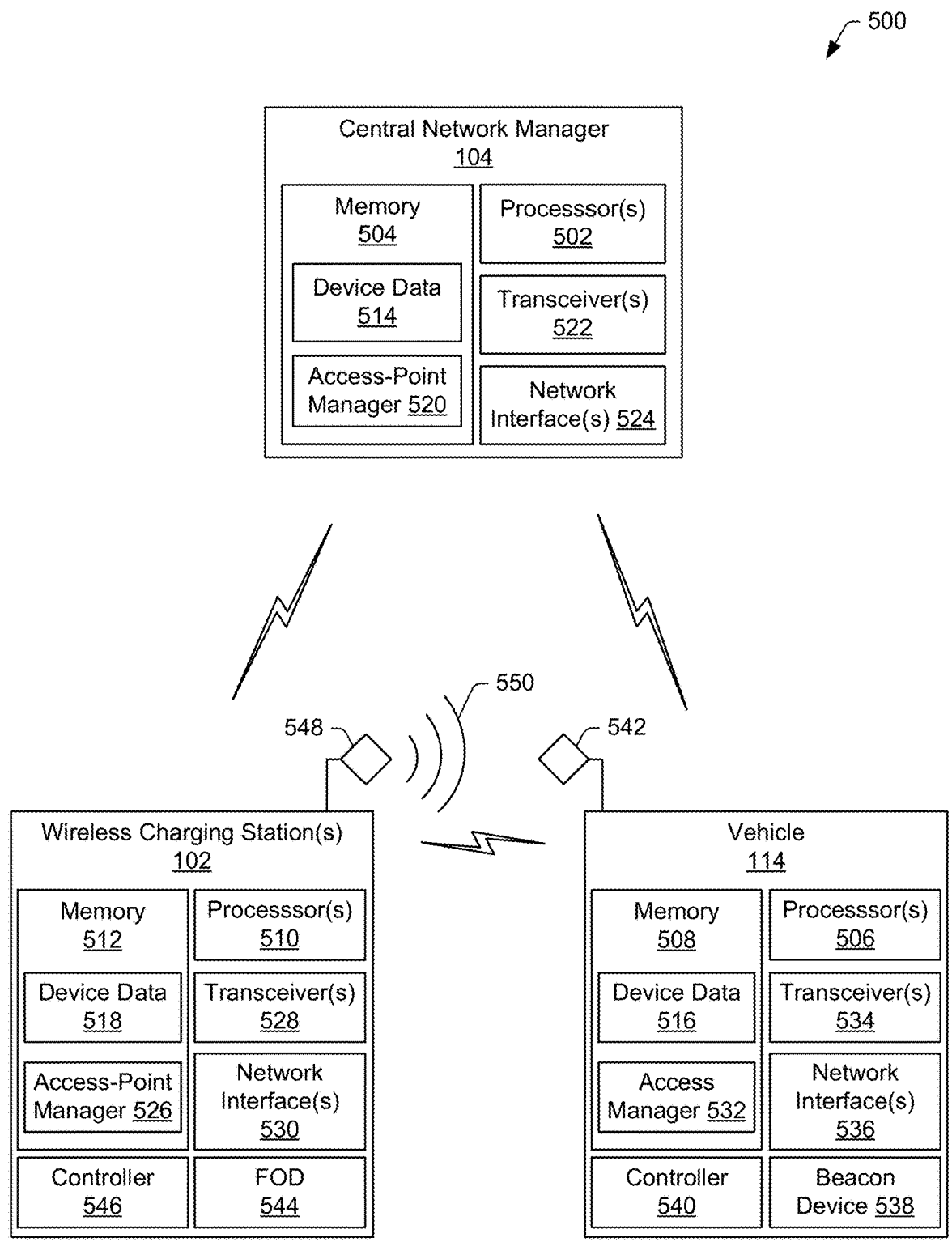
FIG. 5 illustrates an example device diagram of the central network manager, the wireless charging station, and the vehicle in more detail.

FIG. 5 illustrates an example device diagram 500 of the central network manager 104, the wireless charging station 102, and the vehicle 114 in more detail. In aspects, the device diagram 500 describes devices that can implement various aspects of wireless network pairing for wireless electric vehicle charging.

The CNM 104 may include processor(s) 502 and memory 504 (computer-readable storage media). Similarly, the vehicle 114 may include processor(s) 506 and memory 508 (computer-readable storage media). Likewise, the wireless charging station(s) 102 may include processor(s) 510 and memory 512 (computer-readable storage media). Any of the processor(s) 502, 506, and 510 may be a single-core processor or a multiple-core processor composed of a variety of materials, such as silicon, polysilicon, high-K dielectric, copper, and so on. The computer-readable storage media described herein excludes propagating signals. The memories 504, 508, and 512 may include any suitable memory or storage device such as random-access memory (RAM), static RAM (SRAM), dynamic RAM (DRAM), non-volatile RAM (NVRAM), read-only memory (ROM), or Flash memory useable to store device data 514 of the CNM 104, device data 516 of the vehicle 114, and device data 518 of the wireless charging station QQ, respectively. The device data 514 of the CNM 104 includes applications and/or an operating system of the CNM 104 that are executable by processor(s) 502 to enable wireless communication with the wireless charging station(s) 102 and the vehicle(s) 114. The device data 516 of the vehicle 114 includes user data, vehicle data (e.g., identification), applications, and/or an operating system of the vehicle 114 that are executable by processor(s) 506 to enable wireless communication with the wireless charging station(s) 102 and the CNM 104. The device data 518 of the wireless charging station 102 includes applications and/or an operating system of the wireless charging station 102 that are executable by processor(s) 510 to enable wireless communication with the CNM 104 and the vehicle(s) 114.

The memory 504 of the CNM 104 provides data-storage mechanisms to store device data 514, as well as various device applications (not shown) and any other types of information and/or data related to operational aspects of the CNM 104. The memory 508 of the vehicle 114 provides data-storage mechanisms to store device data 516, as well as various device applications (not shown) and any other types of information and/or data related to operational aspects of the vehicle 114. The memory 512 of the wireless charging station 102 provides data-storage mechanisms to store device data 518, as well as various device applications (not shown) and any other types of information and/or data related to operational aspects of the wireless charging station 102.

The memory 504 of the CNM 104 also includes an access-point manager 520 (access-point manager application). Alternatively or additionally, the access-point manager 520 may be implemented in whole or part as hardware logic or circuitry integrated with or separate from other components of the CNM 104. In at least some aspects, the access-point manager 520 configures transceiver(s) 522 to implement the techniques described herein for pairing the vehicle 114 to the wireless charging station 102 for wireless electric vehicle charging. The access-point manager 520 also configures network interface(s) 524 to relay communications between the central network manager 104, the wireless charging station 102, and the vehicle 114.

Similarly, the memory 512 of the wireless charging station 102 includes an access-point manager 526 (access-point manager application). Alternatively or additionally, the access-point manager 526 may be implemented in whole or part as hardware logic or circuitry integrated with or separate from other components of the wireless charging station 102. In at least some aspects, the access-point manager 526 configures transceiver(s) 528 to implement the techniques described herein for pairing the wireless charging station 102 to the vehicle 114 for wireless electric vehicle charging. The access-point manager 526 also configures network interface(s) 530 for communications with the CNM 104 and/or the vehicle 114.

The memory 508 of the vehicle 114 also includes an access manager 532 (access manager application). Alternatively or additionally, the access manager 532 may be implemented in whole or part as hardware logic or circuitry integrated with or separate from other components of the vehicle 114. In at least some aspects, the access manager 532 configures transceiver(s) 534 to implement the techniques described herein for communicating with the CNM 104 and for pairing the vehicle 114 to the wireless charging station 102 for wireless electric vehicle charging. The access manager 532 also configures network interface(s) 536 for communications between the vehicle 114 and the central network manager 104 and/or the wireless charging station 102.

The vehicle 114 also includes a beacon device 538, which may include a beacon circuit coupled to one or more antenna circuits (not shown) and a controller 540. The controller 540 is configured to control the beacon device 538. The beacon device 538 is configured to control one or more antenna circuits of the vehicle 114, which may be referred to or configured as beacon loop antennas, such as a passive beacon or an active beacon (e.g., active beacon as described in U.S. patent application Ser. No. 16/284,959 titled "Extended-Range Positioning System Based on Foreign Object Detection", U.S. patent application Ser. No. 15/003,521, titled "Integration of Solenoid Positioning Antennas in Wireless Inductive Charging Power Applications", U.S. Pat. No. 10,340,752 titled System, "Methods and Apparatuses for Guidance and Alignment in Electric Vehicles Wireless Inductive Charging Systems", and U.S. Pat. No. 10,566,839 titled "Systems, Methods and Apparatus for Guidance and Alignment Between Electric Vehicles and Wireless Charging". The beacon device 538 may be integrated into a power receive element 542, or any other region of the vehicle 114 or the components thereof.

In an example implementation, the controller 540 is configured to control the beacon device 538 by sending control signals to the beacon device 538. The beacon device 538 is configured to change electrical characteristics of the beacon loop antenna in response to the controller's 540 control signals. For example, the beacon device 538 can modulate, vary, or modify one or more electrical characteristics of the beacon antenna in response to the controller's 540 control signals. In aspects, the beacon device 538 can impart a distinctive modulation onto the electrical characteristic of the passive beacon, and the distinct modulation pattern may be used by a FOD circuit 544 and controller 546 of the wireless charging station 102 to uniquely identify the beacon device 538 (e.g., passive beacon) from another foreign object, as described in U.S. patent application Ser. No. 16/052,445, titled "Hybrid Foreign-Object Detection and Positioning System," which is incorporated here in its entirety.

The controller 546 of the wireless charging station 102 is operably coupled to transmit circuitry (not shown) and configured to control one or more aspects of the transmit circuitry or accomplish other operations relevant to wireless network pairing for wireless electric vehicle charging. The controller 546 may be a micro-controller or a processor. The controller 546 may be implemented as an application-specific integrated circuit (ASIC). The controller 546 may be operably connected, directly or indirectly, to each component of the transmit circuitry. The controller 546 may be further configured to receive information from each of the components of the transmit circuitry and perform calculations based on the received information. The controller 546 may be configured to generate control signals (e.g., the control signal) for a component that may adjust the operation of that component. As such, the controller 546 may be configured to adjust or manage inductive power-transfer based on a result of the operations it performs. The memory 512 may be configured to store data, for example, instructions for causing the controller 546 to perform particular functions, such as those related to management of wireless power-transfer and/or foreign object detection and positioning.

The FOD circuit 544 of the wireless charging station 102 is coupled to the controller 546 and is configured to communicate with the controller 546. The controller 546 is configured to control the FOD circuit 544. The FOD circuit 544 may be coupled to one or more FOD sense circuits (not shown), each including a FOD sense coils (not shown) used to inductively sense a foreign object within a magnetic field (e.g., a metal object, the vehicle 114, the vehicle power receiving element 542, the beacon device 538 of the vehicle 114). Each FOD sense circuit is configured to provide a detection signal indicative of a presence of the foreign object within a predetermined sensing area. The FOD circuit 544 then communicates a detection signals to the controller 546, which is configured to determine the presence and a position of the foreign object relative to one or more of the FOD sense coils based on the detection signals.

The wireless charging station 102 also includes a power-transmitting element 548, which is driven by a driver circuit (not shown) at, for example, a resonant frequency of the power-transmitting element 548 based on an input voltage signal. As a result of driving the power-transmitting element 548, the power-transmitting element 548 may generate an electromagnetic field 550 to wirelessly transfer power at a level sufficient for charging a battery (e.g., a battery of the vehicle 114) or otherwise powering a load. The power-receive element 542 may be used to couple to the electromagnetic field 550 and generate an output power for storing or consumption by the vehicle's battery (or load).

The various illustrative logical blocks, modules, circuits, and method steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the described aspects.

The various illustrative blocks, modules, and circuits described in connection with the aspects disclosed herein may be implemented or performed with a general-purpose hardware processor, a Digital Signal Processor (DSP), an Application-Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose hardware processor may be a microprocessor, but in the alternative, the hardware processor may be any conventional processor, controller, microcontroller, or state machine. A hardware processor may also be implemented as a combination of computing devices, e.g., a combination of a DSP and a microprocessor, a plurality of microprocessors, one or more microprocessors in conjunction with a DSP core, or any other such configuration.

The steps of a method and functions described in connection with the aspects disclosed herein may be embodied directly in hardware, in a software module executed by a hardware processor, or in a combination of the two. If implemented in software, the functions may be stored on or transmitted as one or more instructions or code on a tangible, non-transitory, computer-readable medium. A software module may reside in Random Access Memory (RAM), flash memory, Read-Only Memory (ROM), Electrically Programmable ROM (EPROM), Electrically Erasable Programmable ROM (EEPROM), registers, hard disk, a removable disk, a Compact Disc Read-Only Memory (CD-ROM), or any other form of storage medium known in the art. A storage medium is coupled to the hardware processor such that the hardware processor can read information from, and write information to, the storage medium. In another example, the storage medium may be integral to the hardware processor. Disk and disc, as used herein, includes compact disc (CD), laser disc, optical disc, digital versatile disc (DVD), floppy disk, and Blu-Ray™ disc, where disks usually reproduce data magnetically, while discs reproduce data optically with lasers. Combinations of the above should also be included within the scope of computer-readable media. The hardware processor and the storage medium may reside in an ASIC.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed. For example, the context of the above description is wireless charging of electric vehicles, but these techniques may be used in other situations where a portable device needs to join a wireless network corresponding to a specific hardware component located in proximity to the wireless device, and multiple such components or networks may be present.

A number of implementations have been described. Nevertheless, it will be understood that additional modifications may be made without departing from the scope of the concepts described herein, and, accordingly, other embodiments are within the scope of the following claims.

What is claimed is:

1. A method for pairing a vehicle to a selected wireless charging station from a plurality of wireless charging stations, the method comprising:
    joining the vehicle to a first wireless network provided by a central access point;
    assigning a channel to use for pairing the vehicle to the selected wireless charging station by a network manager at the central access point;
    transmitting a channel identifier of the assigned channel to the vehicle over the first wireless network;
    transmitting the channel identifier to the plurality of wireless charging stations;
    configuring, based on the channel identifier, a beacon device coupled to the vehicle to use the assigned channel;
    moving the vehicle into proximity of the selected wireless charging station;
    detecting, by the selected wireless charging station, a beacon signal of the beacon device;
    confirming that the beacon device is using the assigned channel;
    after detecting the beacon signal and confirming that the beacon signal is using the assigned channel, activating a second wireless network;
    transmitting information identifying the second wireless network to the vehicle;
    joining the vehicle to the second wireless network using the transmitted information; and
    after the vehicle has joined the second wireless network, providing alignment guidance from the selected wireless charging station to the vehicle over the second wireless network.

2. The method of claim 1, wherein joining the vehicle to the first wireless network comprises the vehicle detecting the first wireless network and automatically joining the first wireless network.

3. The method of claim 1, wherein joining the vehicle to the first wireless network comprises the vehicle receiving a user input selecting the first wireless network and instructing the vehicle to join the first wireless network.

4. The method of claim 1, wherein joining the vehicle to the first wireless network comprises:
    determining that the vehicle is moving below a predetermined speed;
    searching for available wireless networks;
    detecting the first wireless network;
    determining that the first wireless network is associated with the plurality of wireless charging stations; and
    joining the first wireless network.

5. The method of claim 1, wherein the second wireless network is provided by the selected wireless charging station.

6. The method of claim 1, wherein the plurality of wireless charging stations are each connected to the first wireless network.

7. The method of claim 1, wherein the first wireless network comprises a 802.11 network.

8. The method of claim 1, wherein the second wireless network comprises a 802.11 network.

9. The method of claim 1, wherein transmitting the information identifying the second wireless network to the vehicle is performed by a device other than the selected wireless charging station.

10. The method of claim 1, further comprising:
providing information identifying the vehicle to the plurality of wireless charging stations; and
using the information identifying the vehicle to confirm, at the selected wireless charging station, that the detected beacon signal is provided by the identified vehicle.

11. The method of claim 1, further comprising:
after detecting the beacon signal and confirming that the beacon signal is using the assigned channel and prior to joining the vehicle to the second wireless network, providing the alignment guidance from the selected wireless charging station to the vehicle over the first wireless network.

12. The method of claim 1, further comprising:
determining, by the network manager, which of the plurality of wireless charging stations are available for use by the vehicle; and
transmitting, by the network manager, the channel identifier to only the determined wireless charging stations that are available for use by the vehicle.

13. A vehicle comprising:
a wireless network interface;
a beacon device; and
a processor, the processor configured to establish communication between the vehicle and a selected one of a plurality of wireless charging stations by performing operations including:
joining the wireless network interface to a first wireless network provided by a central access point;
receiving, over the first wireless network, a channel identifier of an assigned channel to use for pairing the vehicle to the selected one of the plurality of wireless charging stations;
configuring, based on the channel identifier, the beacon device to use the assigned channel;
receiving, over the first wireless network, information identifying a second wireless network associated with the selected one of the plurality of wireless charging stations, the second wireless network activated in response to a confirmation that the beacon signal is using the assigned channel;
moving the vehicle into proximity of the selected charging station;
joining the wireless network interface, based on the received information, to the second wireless network to pair with the selected one of the plurality of wireless charging stations after the second wireless network is activated; and
receiving alignment guidance from the selected wireless charging station over the second wireless network.

14. A wireless charging station comprising:
a wireless network interface; and
a processor, the processor configured to establish communication with a vehicle by performing operations including:
communicating with a network manager over a first wireless network;
receiving, from the network manager, a channel identifier of an assigned channel to use for pairing with the vehicle;
detecting a beacon signal operating at the assigned channel;
confirming that the beacon signal is using the assigned channel;
after detecting the beacon signal and confirming that the beacon signal is using the assigned channel, activating a second wireless network;
transmitting, to the network manager, information associated with the detecting of the beacon signal;
receiving a request from the vehicle to join the second wireless network;
enabling the vehicle to join the second wireless network; and
providing alignment guidance to the vehicle over the second wireless network.

15. The wireless charging station of claim 14, wherein the processor is further configured to provide the second wireless network only after detecting the beacon signal.

16. The wireless charging station of claim 15, wherein the processor is further configured to use the wireless network interface to communicate with the network manager over the first wireless network.

17. The wireless charging station of claim 14, wherein the processor is further configured to communicate with the network manager over a network interface other than the wireless network interface.

18. A network manager comprising:
a wireless access point configured to provide a first wireless network; and
a processor, the processor configured to coordinate pairing a vehicle to a selected wireless charging station of a plurality of wireless charging stations that are under control of the network manager by performing operations including:
receiving a request from the vehicle over the first wireless network;
assigning a channel to use for pairing the vehicle to the selected wireless charging station;
transmitting a channel identifier of the assigned channel to the vehicle over the first wireless network to enable the vehicle to configure a beacon device coupled to the vehicle to provide a beacon signal using the assigned channel;
transmitting the channel identifier to the plurality of wireless charging stations;
providing initial alignment guidance to the vehicle to enable the vehicle to move into proximity of the selected wireless charging station;
receiving an indication from the selected wireless charging station that the selected wireless charging station has detected the beacon signal using the assigned channel;
instructing the selected wireless charging station, based on the indication, to activate a second wireless network; and
transmitting, to the vehicle, information identifying the second wireless network provided by the selected wireless charging station to enable the the selected wireless charging station to pair with the vehicle using the second wireless network and provide alignment guidance to the vehicle over the second wireless network.

19. A method for pairing a secondary device to a selected one of a plurality of primary devices, the method comprising:
- joining the secondary device to a first wireless network provided by a central access point;
- determining an identification of an assigned channel to use for pairing the secondary device to the selected one of a plurality of primary devices;
- transmitting the channel identification to the secondary device over the first wireless network;
- transmitting the channel identification to the plurality of primary devices;
- configuring a beacon device coupled to the secondary device to use the assigned channel;
- moving the secondary device into proximity of the selected one of a plurality of primary devices;
- detecting, at the selected one of the plurality of primary devices, a beacon signal of the beacon device using the identified channel;
- based on the detecting, activating a second wireless network and transmitting information identifying the second wireless network to the secondary device;
- joining the secondary device to the second wireless network based on the transmitted information; and
- after the secondary device has joined the second wireless network, providing alignment guidance from the selected one of the plurality of primary devices over the second wireless network.

* * * * *